(12) United States Patent
Steinberg

(10) Patent No.: US 7,313,106 B2
(45) Date of Patent: Dec. 25, 2007

(54) METHOD OF OPERATING A VIRTUAL PRIVATE WIRELESS NETWORK IMPLEMENTING MESSAGE DELIVERY PREFERENCES OF THE USER

(75) Inventor: David A. Steinberg, Washington, DC (US)

(73) Assignee: InPhonic, Inc., Washington, DC (US)

( * ) Notice: Subject to any disclaimer, the term of this patent is extended or adjusted under 35 U.S.C. 154(b) by 886 days.

(21) Appl. No.: 10/606,672

(22) Filed: Jun. 26, 2003

(65) Prior Publication Data

US 2004/0037259 A1    Feb. 26, 2004

Related U.S. Application Data

(62) Division of application No. 09/777,046, filed on Feb. 5, 2001, now Pat. No. 6,618,763.

(60) Provisional application No. 60/180,255, filed on Feb. 4, 2000.

(51) Int. Cl.
*H04Q 7/00* (2006.01)

(52) U.S. Cl. .................. 370/328; 709/206; 379/88.14; 455/412.2; 455/414.4

(58) Field of Classification Search ............... None
See application file for complete search history.

(56) References Cited

U.S. PATENT DOCUMENTS

| | | | |
|---|---|---|---|
| 5,353,331 A | 10/1994 | Emery et al. | |
| 5,557,664 A | 9/1996 | Burns | |
| 5,579,379 A | 11/1996 | D'Amic et al. | |
| 5,625,669 A | 4/1997 | McGregor et al. | |
| 5,633,919 A | 5/1997 | Hogan et al. | |
| 5,740,231 A * | 4/1998 | Cohn et al. | 379/88.22 |
| 5,742,905 A * | 4/1998 | Pepe et al. | 455/461 |
| 5,838,768 A * | 11/1998 | Sumar et al. | 379/88.14 |
| 5,867,566 A | 2/1999 | Hogan et al. | |
| 5,872,926 A * | 2/1999 | Levac et al. | 709/206 |
| 5,987,100 A * | 11/1999 | Fortman et al. | 379/88.14 |
| 6,072,862 A * | 6/2000 | Srinivasan | 379/100.08 |
| 6,185,545 B1 | 2/2001 | Resnick et al. | |
| 6,203,192 B1 * | 3/2001 | Fortman | 379/88.14 |
| 6,212,506 B1 | 4/2001 | Shah et al. | |
| 6,282,276 B1 | 8/2001 | Felger | |

(Continued)

FOREIGN PATENT DOCUMENTS

WO    WO 01/82582    11/2001

(Continued)

*Primary Examiner*—Wing Chan
*Assistant Examiner*—Michael J. Moore
(74) *Attorney, Agent, or Firm*—Patton Boggs LLP

(57) ABSTRACT

A virtual private wireless network in which wireless devices according to the present invention includes at least one wireless device having a screen for displaying received text and an intelligent information interconnect device integrating voice messaging, email, and fax services into a single access point.

The information interconnect device includes a centralized directory database storing identifying information regarding the wireless devices, and further storing delivery preference hierarchy information for delivering content to the wireless devices. A user interface is provided for specifying criteria used to select at least one device ID from the centralized database, and a message delivery system is provided for searching the centralized database using the specified criteria and transmitting information to the wireless device(s) using the delivery preference hierarchy information.

20 Claims, 5 Drawing Sheets

U.S. PATENT DOCUMENTS

| | | |
|---|---|---|
| 6,335,963 B1 * | 1/2002 | Bosco ..................... 379/88.12 |
| 6,397,055 B1 | 5/2002 | McHenry et al. |
| 6,421,707 B1 * | 7/2002 | Miller et al. ................ 709/206 |
| 6,424,706 B1 | 7/2002 | Katz et al. |
| 6,539,082 B1 | 3/2003 | Lowe |
| 6,553,108 B1 | 4/2003 | Felger |
| 6,618,763 B1 * | 9/2003 | Steinberg ................... 709/246 |

FOREIGN PATENT DOCUMENTS

| | | |
|---|---|---|
| WO | WO 02/11422 | 2/2002 |

* cited by examiner

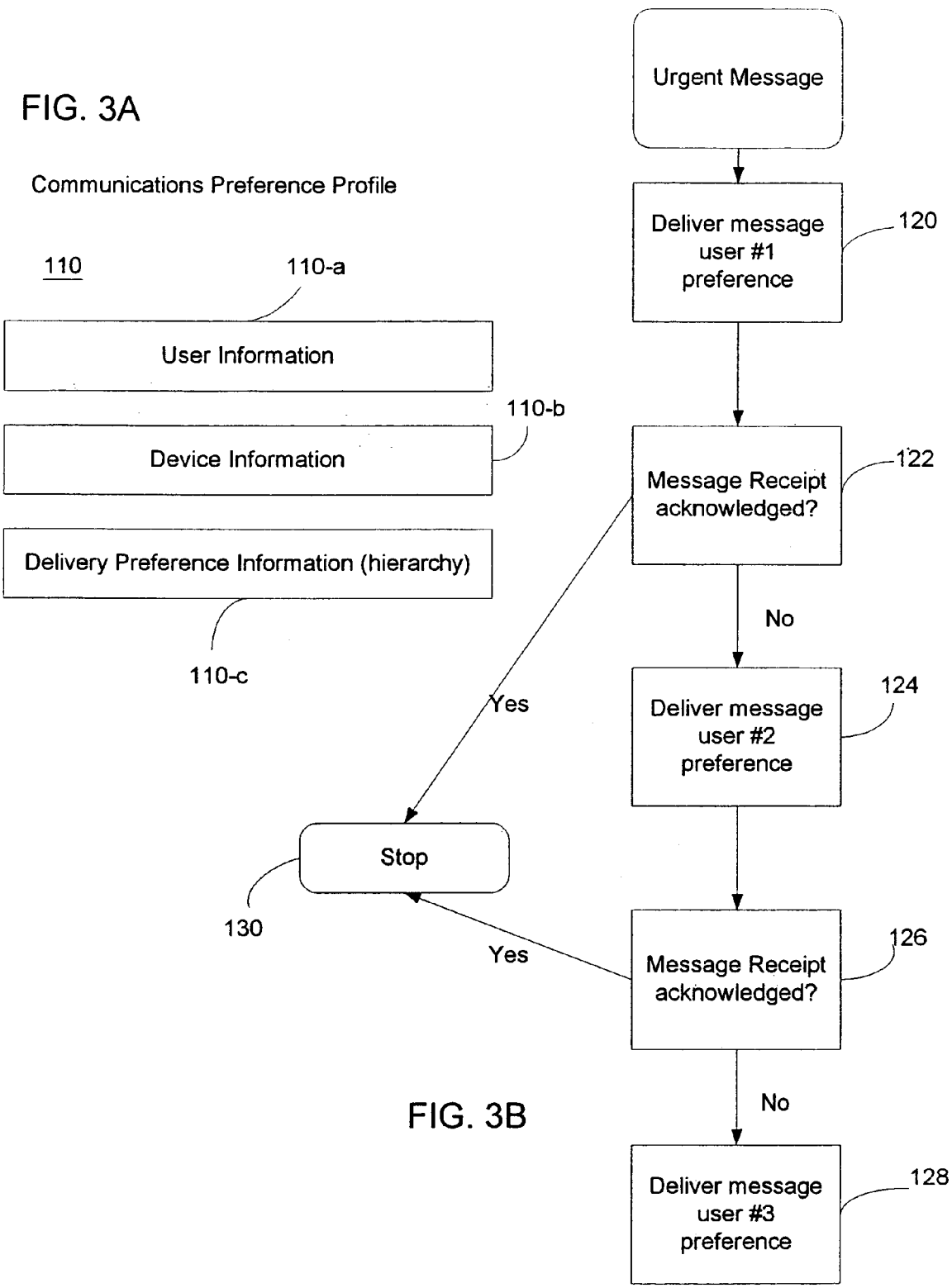

FIG. 3C

Advertising Group

| User 1 |
|---|

| User 2 |
|---|

| User 3 |
|---|

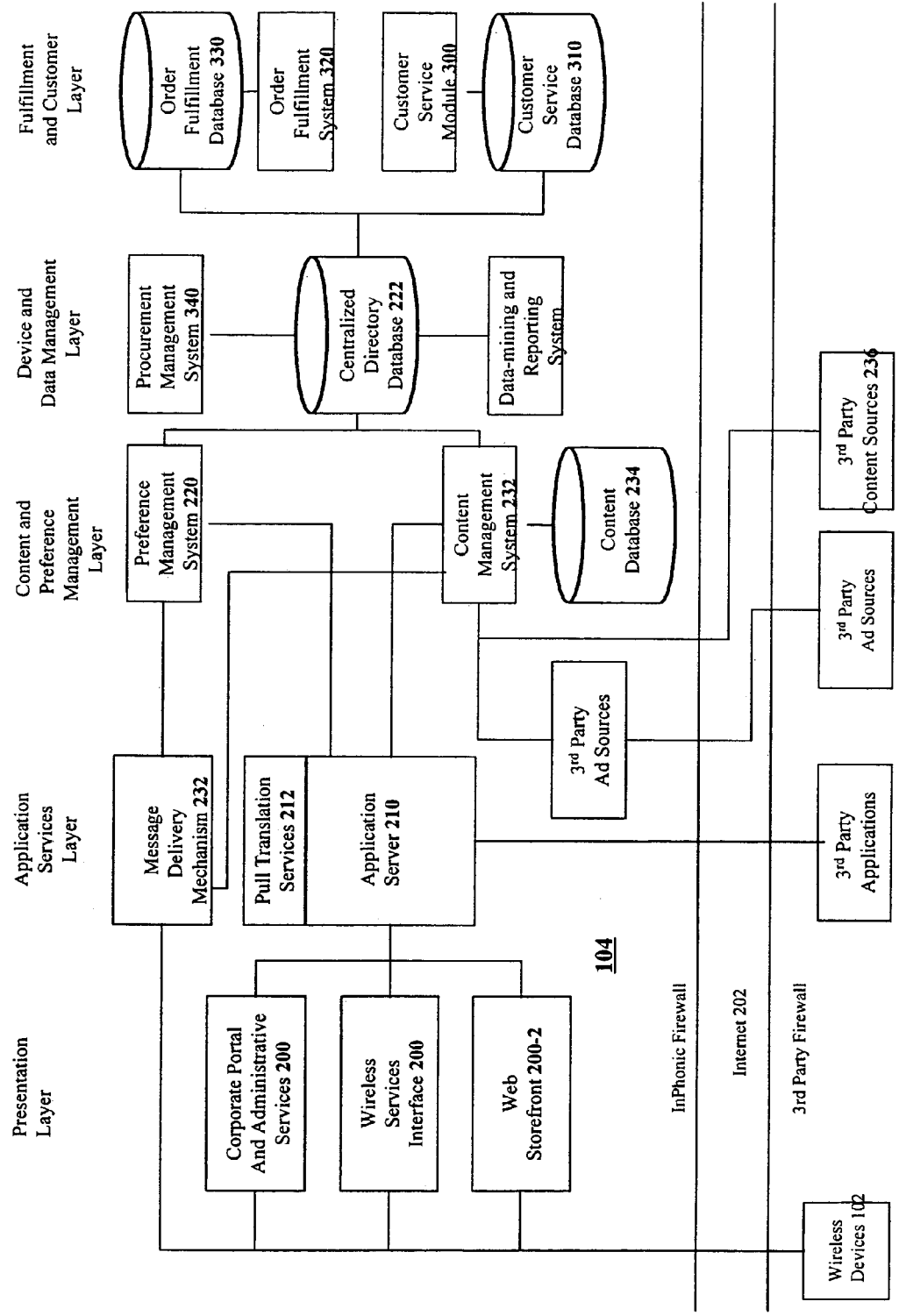
FIG. 4 Virtual Private Wireless Network

METHOD OF OPERATING A VIRTUAL PRIVATE WIRELESS NETWORK IMPLEMENTING MESSAGE DELIVERY PREFERENCES OF THE USER

PRIORITY

This application is a division of application Ser. No. 09/777,046 filed Feb. 5, 2001 now U.S. Pat. No. 6,618,763.

This application claims priority from provisional application Ser. No. 60/180,255 entitled "METHOD OF SELLING PRODUCTS FROM THIRD-PARTY SITES" filed Feb. 4, 2000.

RELATED APPLICATION

The present application is related to and fully incorporates by reference to application Ser. No. 60/180,255, filed Feb. 4, 2000, Entitled "METHOD OF SELLING PRODUCTS FROM THIRD-PARTY SITES".

FIELD OF THE INVENTION

The present invention relates to a virtual network of wireless devices capable of providing transparent data transmission services. More particularly, the virtual private network of the present invention provides an integrated communications solution for users of wireless devices and to the companies that issue such devices to their employees.

BACKGROUND OF THE INVENTION

The use and proliferation of wireless devices has grown markedly. Such devices provide the user with numerous delivery options. A user may receive voice messages using cell phone or voice mail, or text messages using paging devices or email. In fact, wireless devices are increasingly providing the user with multiple delivery option in a single package. Many cell phones and personal digital assistants (PDA's) provide both telephone and email (Internet) capabilities. A single wireless device may soon service all of a user's communication needs.

Many business enterprises issue wireless communications devices to their employees. However, no facility presently exists for integrating voice messaging, email, and fax services into a single access point. Moreover, no facility exists whereby a user can specify delivery preferences in a manner which is transparent to the sender.

Conventional networks including local area networks, and the internet, are not optimized to provide content in a format compatible with wireless devices.

Accordingly, a first object of the present invention is to provide a network optimized for the needs of wireless devices.

A further object of the present invention is to provide a wireless network in which the manner in which content is delivered to the wireless device is transparent to the sender.

SUMMARY OF THE INVENTION

The present invention provides unified messaging services which integrate voice messaging, email, and fax services into a single access point. A virtual private wireless network according to the present invention includes at least one wireless device having a screen for displaying received text and an intelligent information interconnect device integrating voice messaging, email, and fax services into a single access point.

The information interconnect device includes a centralized directory database storing identifying information regarding the wireless devices, and further storing delivery preference hierarchy information for delivering content to the wireless devices. A user interface is provided for specifying criteria used to select at least one device ID from the centralized database, and a message delivery system is provided for searching the centralized database using the specified criteria and transmitting information to the wireless device(s) using the delivery preference hierarchy information.

BRIEF DESCRIPTION OF THE DRAWINGS

FIG. 3A is a table showing the fields included in a user preference profile;

FIG. 3B is a flowchart showing the process for delivering an urgent message according to the hierarchy defined in the preference profile;

FIG. 3C is an example of a communications group; and

FIG. 4 is a block diagram showing details of a first embodiment of the intelligent communications interconnect 104.

DETAILED DESCRIPTION OF THE PREFERRED EMBODIMENTS

Figure 1:
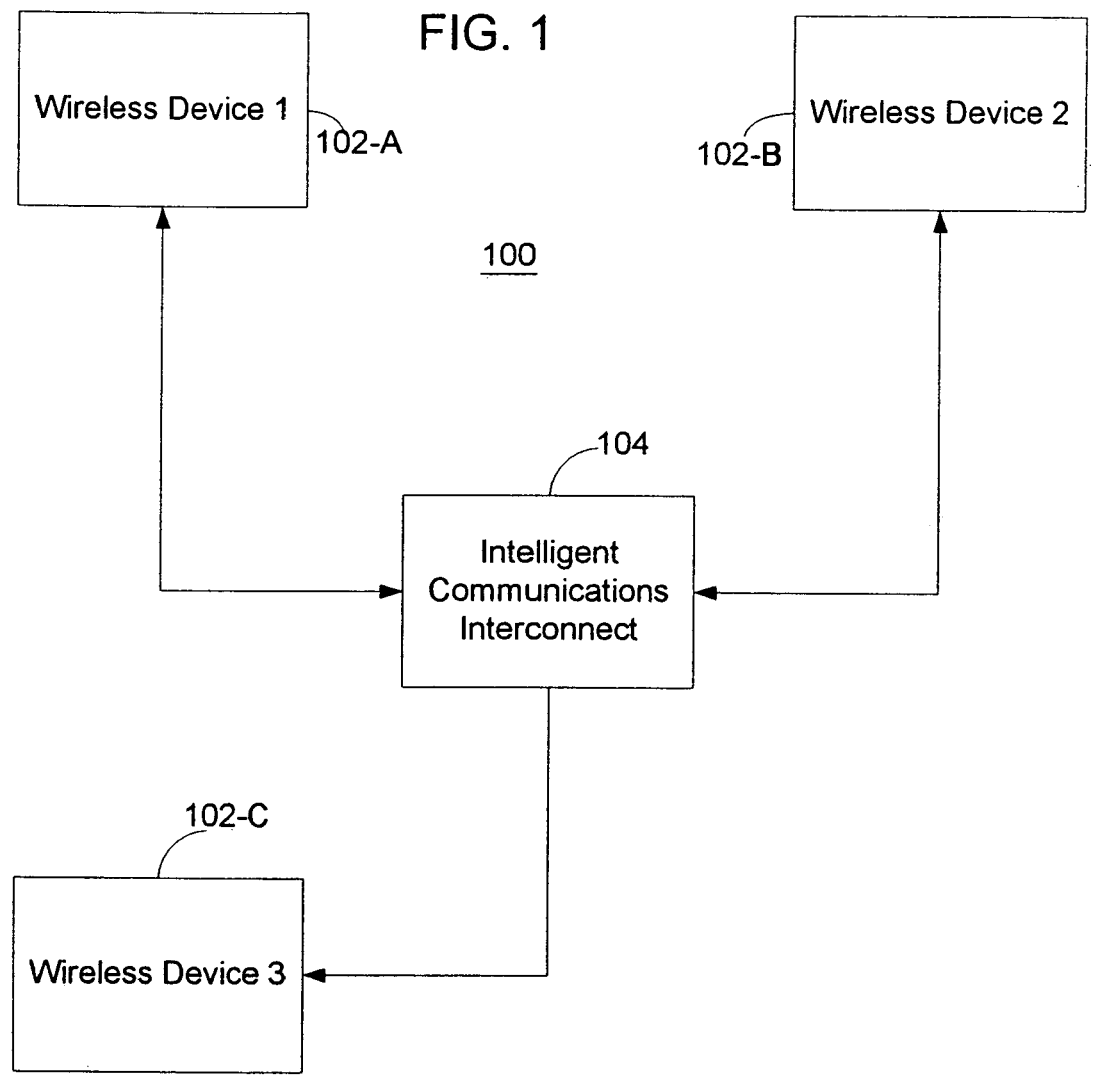
FIG. 1 is a block diagram providing an overview of the virtual private wireless network (VPWN) of the present invention.

FIG. 1 is a block diagram providing an overview of the virtual private wireless network (VPWN) of the present invention, generally designated 100. The VPWN 100 includes a plurality of wireless devices 102 and an intelligent communications interconnect 104. The VPWN supports communications with a wide variety of wireless devices 102 including but not limited to personal digital assistants (PDA's), one-way and two-way pagers, and cell phones including the latest generation of cell phones having wireless internet capabilities.

The VPWN 100 provides a platform for companies, affiliations, and enterprises to disseminate relevant information to their employees, customers, partners, and vendors. This is accomplished through a combination of push and pull technologies that interface traditional IT systems with disparate wireless devices. The VPWN 100 provides a secure platform for aggregating multiple customers on a common platform.

Figure 2:
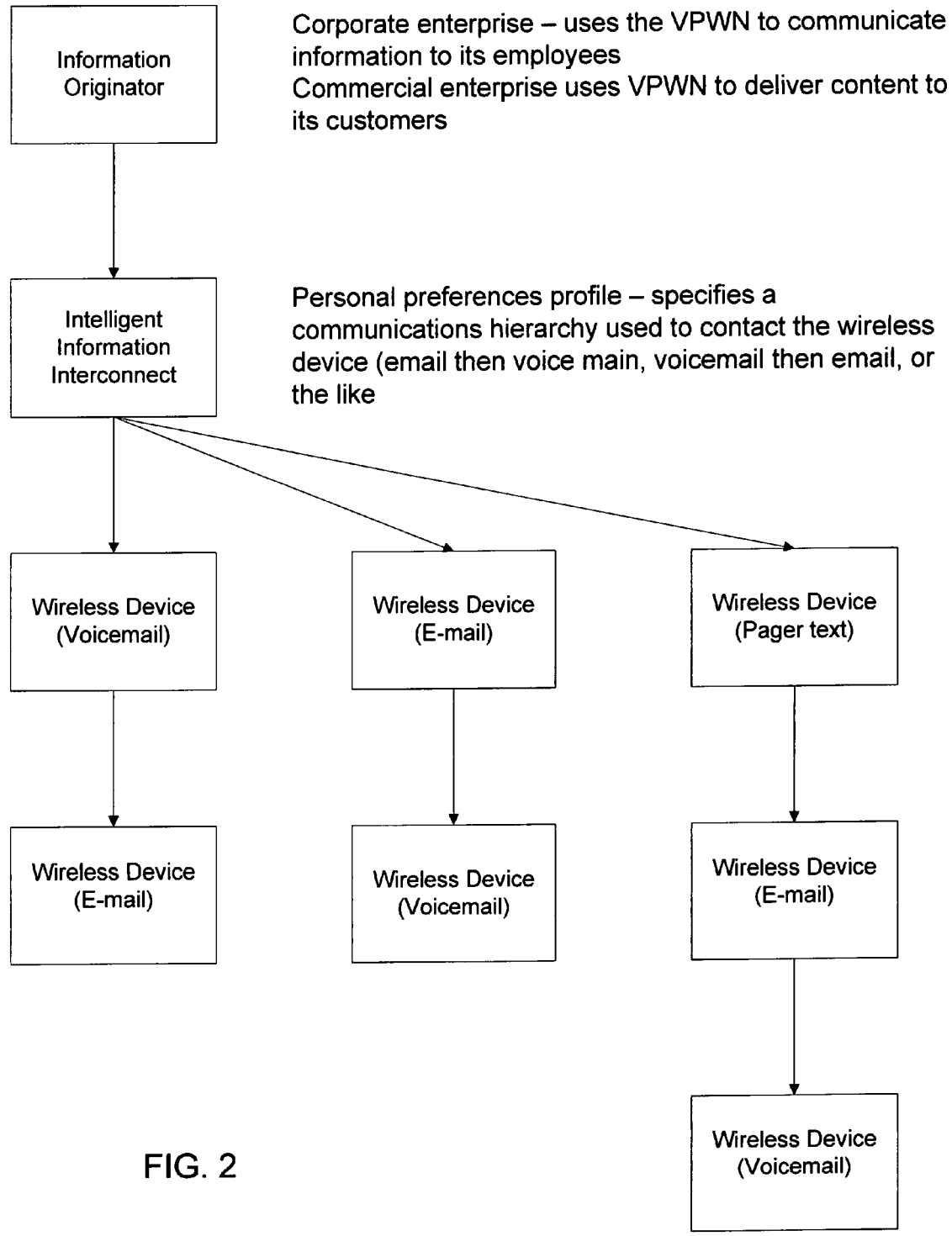
FIG. 2 is a block diagram showing how information is transmitted to wireless devices according to one aspect of the invention.

FIG. 2 is a block diagram showing how information is transmitted to wireless devices 102 according to one aspect of the invention.

As shown in FIG. 2, an information originator 108 communicates information to the wireless device(s) 102 via the intelligent information interconnect 104. According to one aspect of the present invention, the information originator 108 may broadcast a message to a group of wireless devices 102. As will be explained below, the interconnect 104 provides a way to define broadcast (interest) groups to facilitate broadcasting messages. A user defined preference profile 110 (FIG. 3A) contains information used by the interconnect 104 in determining how to deliver information to the device 102.

As shown in FIG. 3A, the preference profile 110 contains user information 110-a, device information 110-b, and delivery preference information 110-c. The device information 110-b includes all device specific information necessary to communicate with the device, including email address, Internet Protocol address (IP address), telephone number, and communications protocol information. The delivery preference information 110-c defines the hierarchy used by the interconnect 104 in attempting to deliver messages.

FIG. 3B is a flowchart showing the process for delivering an urgent message according to the delivery preference hierarchy defined in the preference profile 110. The interconnect 104 attempts to deliver information provided by the originator 108 according to a primary user preference (step 120). Next, the interconnect 104 verifies whether receipt of the message was acknowledged. If the message was acknowledged (step 122), then further processing is unnecessary (step 130). Otherwise, delivery of the message is attempted using the secondary user preference (step 124).

Once again the interconnect 104 verifies whether receipt of the message was acknowledged (step 126). If the message was acknowledged, then further processing is unnecessary (step 130). Otherwise, delivery of the message is attempted using the tertiary user preference (step 128).

The interconnect 104 determines receipt of the message was acknowledged using a variety of conventional methods which are well known in the art. For example, the system can determine whether an email has been read or a voice mail has been replayed. Likewise, two-way pagers transmit an acknowledgment message upon receipt of a message.

Referring once again to FIG. 2, the interconnect 104 first attempts to voicemail a message to user 102-a(1). If acknowledgement of the email is not received within a predefined period, the interconnect 104 attempts to email a message to user 102-a(2).

As will be described below, the interconnect 104 includes logic for translating information into a variety of communications formats. Thus, for example, the interconnect 104 may translate a text message into a voice message, or for converting an email into a page-compatible message format.

FIG. 4 is a block diagram showing details of the intelligent communications interconnect 104.

The communications interconnect 104 includes a user interface 200 used to enter information into, and request information from, the communications interconnect 104. An application server 210 coordinates the services provided by the various functional units of the communications interconnect 104, and includes a translation services module 212 used to translate content into a format compatible with the wireless device 102.

One of ordinary skill in the art will appreciate that there is not a single universal communications format compatible with all currently available wireless devices. The translation module 212 of the present invention performs its translation services in a manner which is transparent to the wireless device 102.

According to a preferred embodiment, the user interface 200 is a web page or the like accessible via a communications network 200 such as a local area network the Internet, or the like. Moreover, the user interface 200 may include a telephone menu system such as is known in the art.

A preference management system 220 is used to define and maintain a user's communications preference profile 110, which is stored in a centralized directory database 222.

Figure 3C:
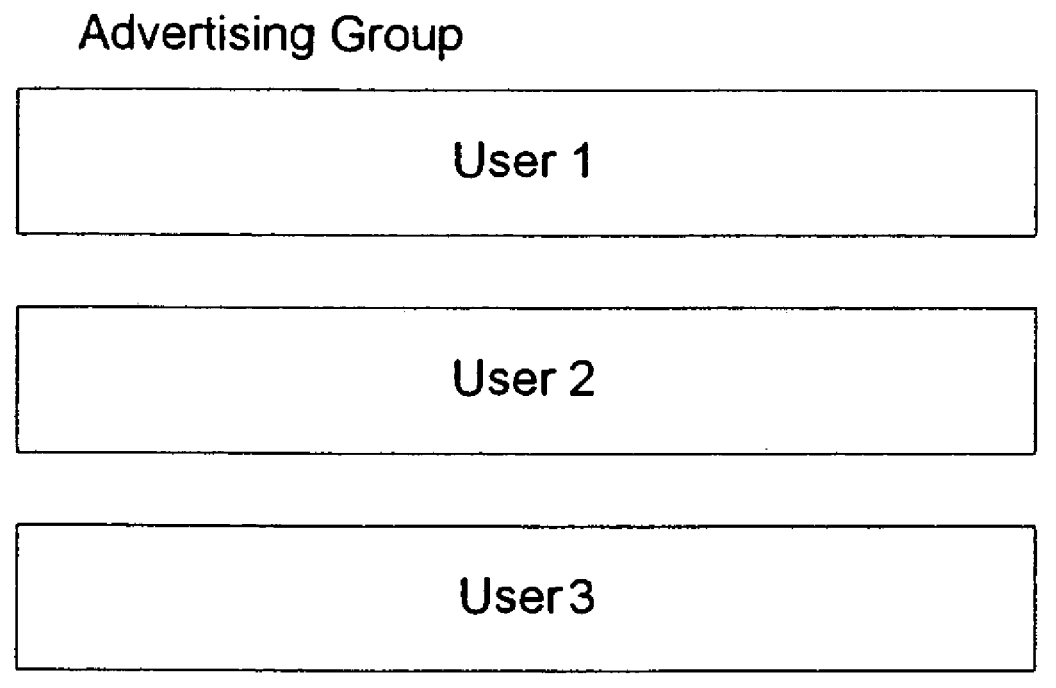

In addition the preference management system is used to create user-defined broadcast groups (FIG. 3C)

The centralized directory database 222 provides multiple levels of administration for all types of organizations, and manages the associated permissions to manage data access across the organizations. Thus, for example, different administration level may be defined which enable a workgroup to manage user lists, broadcast messages, set delivery parameters and access levels of enterprise data on a pull basis.

According to a preferred embodiment, the directory database 222 is built using a Lightweight Directory Access Protocol (LDAP) which allows ad hoc extensions for managing additional permissions. Notably, LDAP is simply a database that allows additional attributes (fields) to be added to an existing database, on-the-fly, without having to redesign the database. According to a preferred embodiment, LDAP is implemented using Microsoft SQL 2000; however other LDAP implementations may also be used. The common directory supports a number of advanced services such as unified messaging and e-mail and phone "follow-me" roaming services.

More particularly, a message delivery mechanism (MDM) 230 (FIG. 4) performs the actual distribution of content to the wireless device 102. The MDM 230 accesses the directory database 222 via the preference management system 220 to determine a device information 110-b such as phone number (text-to-speech message delivery), IP address, or E-mail address. The MDM 230 attempts to deliver content using the delivery preference hierarchy defined in the preference management system 220 until it can insure that the message was received.

According to one aspect of the invention, the interconnect 104 provides unified messaging services which integrates voice messaging, email, and fax services into a single access point. The interconnect 104 provides a complete voice-messaging solution for the enterprise. Subscribers can retrieve, store, and record voice messages as well as edit, forward with comments, and reply to a subscriber's message with a phone call.

The VPWN 100 further provides Single Number Reach and Intelligent Notification Services which allow subscribers to be more responsive to their own customers. Single Number Reach is a user-configured feature by which a subscriber defines a cascade of phone numbers which the VPWN 100 will use in attempting to contact the subscriber.

For example, a subscriber may provide the VPWN with work (primary contact), cell phone (secondary contact), and home telephone numbers (tertiary contact). A user trying to call the VPWN subscriber will seamlessly be routed first to the primary contact, and then to the secondary and tertiary contacts in the order provided. Additionally, when a voice message is left for the user, the intelligent notification service will route a notification message through the content management system 232 to the message delivery mechanism 230 and to the user in the form of an SMS message or e-mail to alert them to the message waiting within the system.

The follow-me roaming services provided by the VPWN 100 allows end-users to direct content and call delivery to a pre-selected device or group of devices. The interface 200 enables a user to identify device(s) 102 to the interconnect 104, and specify the order in which the interconnect 104 looks for the device(s) in order to deliver the content.

Preferably, the preference profile created by the preference management system will include delivery preference information for content received from identified users or groups of users. In this manner, the preference management system enables a user to specify different delivery preferences for different message originators 108.

A combination of methods is used to determine if a message was received. If the message has not been read within a specific amount of time, the message is then attempted using the secondary or tertiary address. For example, an e-mail message may be sent as an HTML-type e-mail with an embedded dynamic link back to the VPWN message delivery server 230. If a request is made to this dynamic link, then the system 100 assumes that the HTML message was received.

A Content Management System (CMS) 232 provides a central point for the collection and dissemination of content within the VPWN 100, and manages data stored in the content database 234. Preferably, content is stored in database 234 in a device neutral format which is may be viewed using a browser or the like provided on the wireless device 102. If necessary, the translation services module 212 may translate (transcode, decode or clip) the content into a format compatible with the wireless device 102.

The CMS 232 includes a rules engine (not illustrated) which gathers information from the Centralized Directory Database 222 in order to identify which user should have access to the various portions of the content stored in the database 234. More particularly the access parameters are established by the user within the Preference Management System 220 or by the corporate/enterprise administrators.

For example, a business enterprise may utilize the VPWN as a virtual intranet. Importantly, the VPWN 100 incorporates a wide variety of security features to minimize the threat of unauthorized access.

As shown in FIG. 4, the CMS 232 may (optionally) communicate with a third party content provider 236. The CMS 232 ensures that the correct content is delivered to, or made available to, the end-user 102 based upon information pulled from the directory database 222. Thus, for example, the preference management system could provide the user to subscribe to a variety of third-party content.

In addition, the CMS 232 incorporates a rule-based engine that can tailor content based upon various inputs, for example, partner, individual, content type, content source, content security levels. The rules based engine gathers information from the Centralized Directory 222 used to identify which users should have access to particular content (pull) in the Content Database 234, and which content should be sent (pushed to particular users using parameters are established by the user within the Preference Management System 220 or by the corporate/enterprise administrators 200.

Referring once again to FIG. 2, the information originator 108 may be a corporate enterprise which uses the VPWN to communicate to its employees. According to this example, the corporate enterprise would administer the content it desires to deliver using the content management system 232 which it accesses via the interface 200. Content is stored in a content database 234. Moreover, content may be provided by third party content providers 236 and disseminated via the MDM 230 according to (interest) group information maintained by the CMS 232 and delivery preference information maintained by the preference management system 220.

Optionally, the VPWN may be integrated with a Web-Based Storefront 200-2 used to sell wireless devices.

According to the embodiment depicted in FIG. 5, the VPWN provides value added services to storefront 200-2. Fore example, the storefront 200-2 may utilize the database 222 to store customer information.

In the embodiment shown in FIG. 4, the VPWN includes a Customer Service Module 300 which allows customer service representatives to maintain information on all aspects of a customer's wireless devices. This is accomplished through the directory database 222 and/or a customer service database 310.

The Customer Service Database 310 maintains user and enterprise level information. It allows customer service representatives to provide first level support by having access to user profile information such as enterprise affiliation, specific wireless device information (SN, model number, applications), wireless service information (calling/service plan, plan rates, network coverage), workgroup information (security levels, group assignments, group administrator contact information).

An order fulfillment system 320 may be provided for gathering customer data, validating a customer order, and ultimately performing the necessary technical and manual transactions to complete the setup of the wireless devices purchased from the Web-Based Storefront 200-2. The order fulfillment system 320 stores customer order data in an order fulfillment database 330.

An optional procurement management system 340 enables an organization to manage a variety of wireless devices using a common platform. More particularly, the procurement management system 340 enables an organization to track total cost of ownership, allowing an organization to carefully manage their device inventory. This information feeds back into the common directory 222 to insure that the VPWN 100 always has the most current IP address, phone number, and e-mail address for any individual's current devices 102.

While various embodiments of the present invention have been shown and described, it should be understood that other modifications, substitutions and alternatives can be made without departing from the spirit and scope of the invention, which should be determined from the appended claims.

What is claimed is:

1. A method of operating a virtual private wireless network, comprising the steps of:

receiving identifying information regarding at least one wireless device;

storing said identifying information in a database;

receiving and storing delivery preference hierarchy information for delivering content to the at least one wireless device(s) including receiving a preference of a user relating to an order of content format types that is to be used to send messages to the at least one wireless device capable of receiving messages in a variety of content formats;

receiving a voice message, an email message or a fax message at a signal access point of the network, said message having content in a first format and indicating specifying criteria directed to at least one selected wireless device;

searching said database using said specifying criteria to determine at least one selected device ID;

translating said first format of said content to a second format compatible with said selected wireless device(s) including performing one or more operations on said content selected from the group of clipping, transcoding, and decoding; and transmitting said content in said second format to said selected wireless device(s) corresponding to said selected device ID using said delivery preference hierarchy information.

2. The method according to claim 1, wherein receiving said delivery hierarchy preference information includes receiving a user's preference relating to an order said messages are attempted to be sent to more than one wireless device.

3. The method of claim 2, wherein said user's wireless devices provide a variety of content formats, and said order of said wireless devices is established by said user selecting an order of content formats.

4. The method according to claim 1, further comprising the step of entering at least one of said identifying information and said delivery preference hierarchy information on a user interface providing a web page accessible via a communication network.

5. The method according to claim 4, wherein the entering further comprises:
providing access to only a predetermined subset of said database to a given user; and
searching said predetermined subset to select said device ID.

6. The method according to claim 1, further comprising the step of entering at least one of said identifying information and said delivery preference hierarchy information on a user interface providing a menu structure compatible with a touch tone phone.

7. The method according to claim 1, further comprising:
storing said content as content in a content database;
managing content data stored in said content database and managing content subscription lists for each of said wireless devices with a content management system; and
selectively providing said content to said message delivery system in response to a request from a user interface said content being provided using subscription information contained in said content subscription lists.

8. The method according to claim 1, further comprising the steps of:
receiving data with said message in a first delivery format including said identification information used to identify a given said wireless device;
changing said first delivery format of said received data to a second delivery format; and
delivering said received data to said selected wireless device in said second delivery format, wherein said second delivery format is independent of said first delivery format.

9. The method of claim 8, wherein said first delivery format is any of fax, email and a voicemail message and said second delivery format is different from said first delivery format and is selected from the group including voicemail, email, pager text and text for display on a wireless telephone.

10. The method of claim 1, wherein a user has a number of said wireless devices, and said message is received by a first wireless telephone in voice delivery format, said first wireless telephone in text format for display on said first wireless telephone, a pager and a Personal Data Assistant (PDA).

11. A method of using a virtual private wireless network, comprising the steps of:
receiving and storing a message having a first delivery format and having content in a first format; said delivery format being one from the group including email, voicemail and fax;
determining which of a plurality of wireless devices said message is intended for by looking up prestored user information, device information for said plurality of wireless devices, and delivery preference hierarchy information for said user, wherein looking up said delivery hierarchy preference information includes looking up a preference of a user relating to an order of content format types that is to be used to send messages to at least one of said plurality of wireless devices capable of receiving messages in a variety of content formats;
translating said first format of said content to a second format compatible with a selected said wireless device, including performing one or more operations on said content selected from the group of clipping, transcoding, and decoding; and
transmitting said content in said second format to said selected wireless device in accordance with said device information.

12. The method according to claim 11, wherein receiving said delivery hierarchy preference information includes receiving a user's preference relating to an order said message is attempted to be sent to each of said plurality of wireless devices when said user has a plurality of said wireless devices.

13. The method of claim 12 wherein said user's wireless devices provide a variety of content formats, and said order of said wireless devices is established by said user selecting an order of content formats.

14. The method according to claim 11, comprising the step of providing access to the network only to wireless devices defined in said directory database.

15. The method according to claim 11, further comprising the step of changing said first delivery format to a second delivery format for transmission to said wireless devices, and wherein said second delivery format is independent of said first delivery format.

16. The method of claim 11, wherein said second delivery format includes one from the group including voicemail, email, pager text, and text for display on a wireless telephone.

17. A method of providing a virtual network for wireless devices, comprising:
receiving wireless device information and delivery preference hierarchy information specifying at least one content format used to deliver content to at least one wireless device including receiving a preference of a user relating to an order of content format types that is to be used to send messages to the at least one wireless device capable of receiving messages in a variety of content formats;
storing said wireless device information and said delivery preference hierarchy information;
receiving content from a message originator;
identifying the wireless device(s) to which said received content is directed; and
deliver said received content to the wireless devices in accordance with said delivery preference hierarchy information.

18. The method of claim 17, further comprising the steps of:
translating a first format of said content to a second format compatible with a selected wireless device including performing one or more operations on said content selected from the group of clipping, transcoding, and decoding; and transmitting said content in said second content format to said wireless device in accordance with said wireless device information.

19. The method according to claim 17, wherein receiving said delivery hierarchy preference information includes receiving a user's preference relating to an order said received content is attempted to be sent to more than one wireless device.

20. The method of claim 19 wherein said user's wireless devices provide a variety of content formats, and said order of said wireless devices established by said user selecting an order of content formats.

* * * * *